United States Patent [19]

Ogle

[11] 3,878,099
[45] Apr. 15, 1975

[54] MOUNTING FOR LIQUID CHROMATOGRAPH COLUMN

[75] Inventor: David G. Ogle, Sunnyvale, Calif.

[73] Assignee: Beckman Instruments, Inc., Fullerton, Calif.

[22] Filed: Apr. 8, 1974

[21] Appl. No.: 458,645

[52] U.S. Cl. .............................. 210/198 C; 55/386
[51] Int. Cl. ........................................... B01d 15/08
[58] Field of Search ..................... 210/198 C; 55/386

[56] References Cited
UNITED STATES PATENTS

| | | |
|---|---|---|
| 3,334,514 | 8/1967 | Catravas ........................... 55/386 X |
| 3,346,486 | 10/1967 | Winter et al. ................ 210/198 C X |
| 3,487,938 | 1/1970 | Patterson ........................ 210/198 C |
| 3,511,377 | 5/1970 | Hadina ............................ 210/198 C |
| 3,615,235 | 10/1971 | Hadina ....................... 210/198 C X |

Primary Examiner—John Adee
Attorney, Agent, or Firm—R. J. Steinmeyer; F. L. Mehlhoff

[57] ABSTRACT

A water jacketed chromatograph resin column for a liquid chromatograph analyzer is provided with end fittings which may be attached to the column and the end fittings are secured to mounting brackets on a panel to relieve the water jacket and the column of tensile forces resulting from liquid pressure in the column.

13 Claims, 6 Drawing Figures

MOUNTING FOR LIQUID CHROMATOGRAPH COLUMN

BACKGROUND OF THE INVENTION

In liquid chromatography systems there is a chromatographic column comprising a tube containing component-separating resin, which tube is usually temperature controlled by means of thermostated water flowing through a surrounding water jacket. Liquid chromatograph columns are used to separate the constituents of a sample composition introduced into the column in a carrier solution pumped therethrough. In amino acid analysis, amino acids or groups of amino acids are separated within such a column by ion exchange as they are eluted therethrough in a suitable aqueous buffer solution.

Water jacketed chromatograph columns are sometimes subjected to high internal pressure created by the pressure of the buffer solutions passed through the column. When the column and water jacket are directly attached to each other at the ends thereof, the tensile forces created by the fluid pressures created within the columns and water jacket often cause the joint between these members to fail. Moreover, a column, including a water jacket fused thereto, has to be made up to a specific length so that the experimenter must have on hand columns and water jacket of several different lengths in order to change the methodology for the analysis.

What is needed, therefore, is an arrangement wherein end fittings for the column may be spaced approximately the distance needed to accommodate the length of water column selected but, in which, the arrangement is not critical as to the length of water jacket which can be accommodated.

Present columns and outer water jackets are made of glass and the ends of the inner glass column protrude from the water jacket. A flange of glass, fused to the end of the column and in some cases to the water jacket, provides a ledge on which to attach end fittings with laboratory clamps. This glass forming and sealing process contributes to the high cost of present columns, to the lack of uniformity in the inner diameters of the columns at the top and bottom where the glass sealing occurs, and to the breakage of the columns. Whenever glass is altered in its basic form of tubing by fusing it with other pieces of glass, internal stresses are set up which are very difficult, if not impossible, to remove completely and this results in a weakness of the tubing at the ledge where the end fittings are attached.

In conventional arrangements also, the end loading on a tube fitting adapter is transmitted to the water jacket itself, producing tensile stress in the jacket and sheer stress at the bond between the jacket and the fitting. In addition, when the tensile stress, created by the hydraulic pressures, acts directly on the column or the water jacket, the working pressure that can be employed is greatly reduced. Moreover, conventional arrangements do not provide for adjustment to allow the input line to the column to be lowered to essentially the top of the resin bed to minimize fluid holdup in the column and thereby reduce sample diffusion.

It is, accordingly, an object of the invention to satisfy the requirements of efficient, reliable liquid chromatography and overcome disadvantages of present arrangements.

Other and further objects, features and advantages of the invention will become apparent as the description proceeds.

SUMMARY OF THE INVENTION

In carrying out the invention, common end fittings are provided for supporting a straight liquid chromatographic column and its surrounding straight water jacket. The end fittings are not attached directly to the column or the water jacket, nor are these members attached to each other. However, seals are provided between the surfaces of the chromatograph column and the end fittings and between the water jacket and which are so arranged and constructed that the tensile forces created by the hydraulic pressure within the respective column and water jacket are transmitted directly to the end fittings; and the end fittings are independently supported on a panel or other support so that the column and the water jacket are relieved of tensile stress. In addition the arrangement does not require flanged attachments fused to the column or to the water jacket making the arrangement more versatile with respect to the length of column that may be employed.

A better understanding of the invention will be afforded by reference to the following detailed description considered in conjunction with the accompanying drawings.

DRAWINGS

In the drawing,

FIG. 1 is a fragmentary diagram showing a longitudinal section of the upper end of a liquid chromatograph column and an associated water jacket having an end fitting in accordance with an embodiment of the invention, FIG. 2 is a view, to an enlarged scale, of a portion of the apparatus of FIG. 1 adjacent the upper end of the resin column, FIG. 3 is a side view of the apparatus represented in FIG. 1, illustrating the attachment of a fitting to its support structure, FIG. 4 is a view corresponding to FIG. 1 showing both upper and lower fittings of a chromatograph column and the water jacket inlet and outlet, FIG. 5 is a fragmentary bottom view of a removable clip arrangement for fitting support, and FIG. 6 is an enlarged scale view of the lower end of the resin column.

Like reference characters are utilized throughout the drawing to designate like parts.

DETAILED DESCRIPTION

Figure 1:
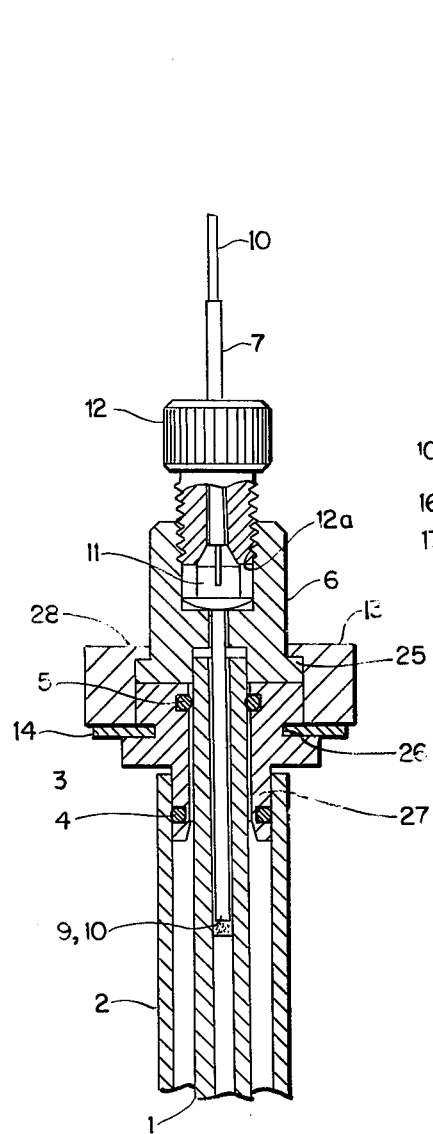

A construction is illustrated in the drawings which is especially well adapted to analysis of small samples for which a "microbore" column construction is desired. As illustrated in FIG. 1, the column assembly comprises a heavy wall, precision-bore glass tube 1, surrounded by a circulating water jacket provided by a hollow cylinder or tube 2 of normal thickness drawn from glass or composed of a suitable plastic such as polycarbonate, and end fittings with seals. In FIG. 1 only the upper end fitting is shown. This comprises two parts, namely a bottom column fitting 3 with O-ring seals 4 and 5 to seal the space between the end fitting and the water jacket and the column respectively, and an upper column fitting 6 to hold an adjustable column head space assembly. The column head space assembly comprises a metal tube 7, a bushing 8, a seal 9 and a tube 10 with an integral formed end flange 10a, shown in detail in FIG. 2. The head space fitting also includes a split grommet 11 surrounding the tube 7, and a locking screw 12. The locking screw is hollow also surrounding the tube 7 and has threads engaging a threaded bore 12a at the upper end of the upper column fitting 6 so that by turning the screw 12 into the bore 12a the grommet 11 may be squeezed around the tube 7 to hold it with respect to the upper column fitting 6.

Figure 3:
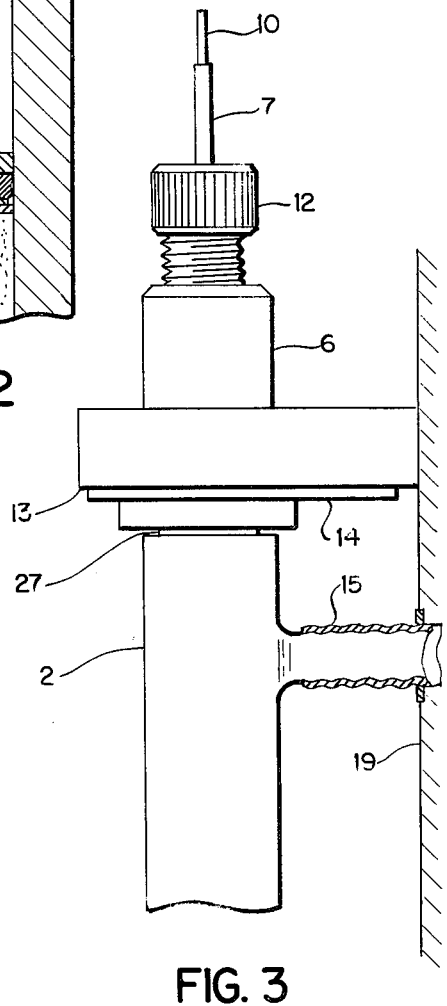
Figure 5:
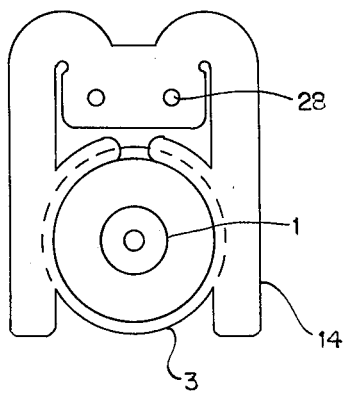

For supporting the column assembly, upper and lower mounting and supporting brackets 13 and 13' (see FIG. 4) are provided. The upper bracket 13 only is shown in FIG. 1. The brackets 13 and 13' hold the end fittings parts 6 and 6' in a fixed spaced relation. For this purpose, the brackets 13 and 13' are provided with an inwardly extending lip 28 which abuts the collars 25 and 25' formed at the base of the fittings 6 and 6'. A spring clip 14 is provided which fits a peripheral groove 26 formed in the fitting 3 and under the bracket 13. A similar clip 14' is provided for the lower bracket assembly and the configuration is substantially the same at both ends. The clips 14 and 14' are removably secured by screws (not shown) extending through screw holes 28 into the support brackets 13 and 13', which, as illustrated in FIG. 3, are attached to the support structure for the column, such as a panel or the like. Circulating water connections 15 and 15' are shown (see FIG. 4) at the upper and lower ends of the water jacket 2.

Although the column has been illustrated as vertically mounted with the eluent entering from above and with the inlet water connection 15' below, the invention is not limited thereto and does not preclude utilizing the upper water fitting 15 as the inlet, or mounting the column horizontally.

If a microbore column is desired, the inner bore of the glass column 1 is of the order of 2.8 millimeters, although it may be somewhat larger or smaller. Typically there is a problem in columns of this size to obtain a reliable seal of the delivery tube 10 to the glass tube 1 along with an infinitely variable height adjustment to take care of the relative position of the head of the resin bed. In accordance with the invention, a reliable seal under such circumstances is accomplished by providing a bushing 8 composed of a suitable polymeric material, such as a fluorocarbon product of chlorotrifluoroethylene (CTFE) elastomer such as that sold by Minnesota Mining Company under the trade name Kel-F. The bushing 8 and the metal tube 7 provide a centering arrangement for the flanged tube 10. The latter may be composed of polytetrafluoroethylene (PTFE) such as that sold under the mark Teflon, or a fluoropolymer of ethylene and PTFE, called ETFE, or it may be composed of other small bore flexible fluorocarbon tubing material. The seal 9, of the type sold by Minnesota Rubber co. under the trademark Quad-Ring or an O-ring, is positioned between the end of the bushing 8 and a flange 10 formed in the delivery tube to provide a high pressure seal both on the inner diameter of the column 1 and the tubing 10 near the flange. This novel feature of the invention has an advantage in that, as the internal pressure increases, the force exerted by the fluid upwardly against the tubing flange increases the sealing pressure and consequently the effectiveness of the seal.

Adjustability of the head space assembly is obtained by providing a locking (or clamping) screw 12 which may be loosened for sliding the tube 7 up and down. The split grommet 11 is squeezed around the circumference of the tube when the screw 12 is tightened in order to clamp the tube 7 in position.

Figure 2:
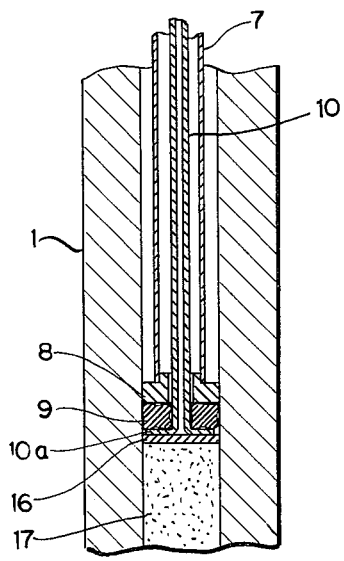
Figures 4, 6:
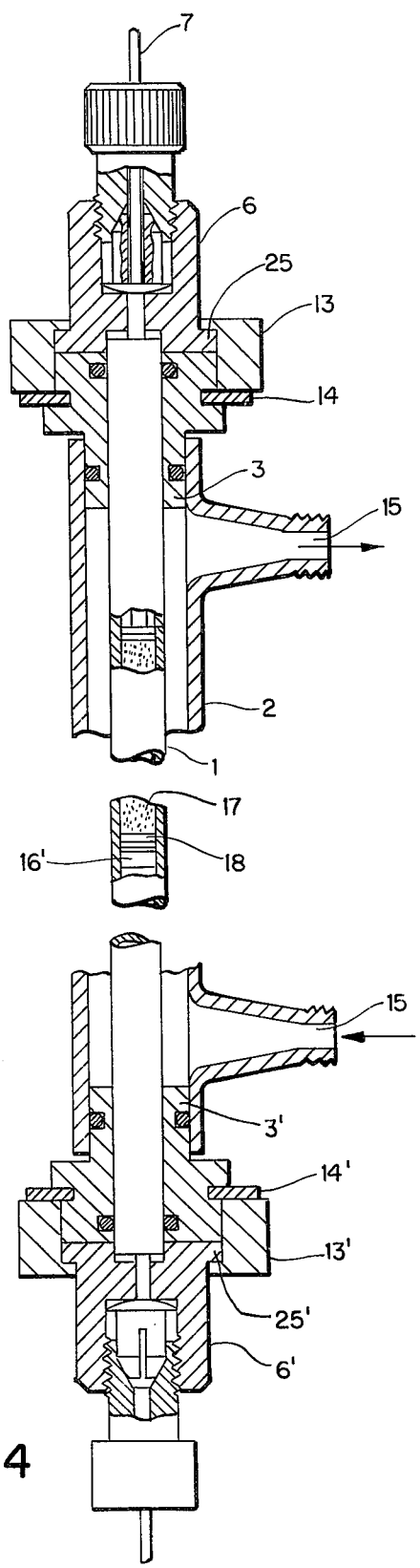

As shown in FIG. 2, a porous Teflon disc 16 rests on the top of a packed resin bed 17. In utilizing the apparatus, the sample and the eluting buffer are delivered down the tube 10 and somewhat diffused by the Teflon disc 16 over the surface of the resin bed 17. Although the upper and lower end fittings contain the same hardware, it is advantageous to provide a thin stainless steel screen 18 (as shown in FIG. 4) between the resin bed 17 and the lower Teflon disc 16' to act as a support for the resin bed.

It will be observed that all the tensile, axial load caused by internal hydraulic pressure acting on the internal column fittings is taken by the mounting brackets and they are firmly attached to a column support member or column panel 19. The column panel 19 may be so constructed as to enable column assemblies of different lengths to be fastened to it by moving the mounting brackets 13 and 13' to different positions on the panel to accommodate the various column lengths. As seen from FIG. 4, internal pressure generated by pumping the eluting buffer through the resin bed 17 by means of the connecting tube 10 acts on the flange of the tube 10a. The force produced (equal in both directions axially), squeezes the seal 9, which in turn acts on the bushing 8 and adjustment tube 7. Since the tube is clamped by the split grommet 11 and the clamping screw 12, the force is transmitted to the upper column fitting 6 and in turn to the bracket 13. Thus the column 1 and the water jacket 2 are free of axial loading. The column 1 is subjected to internal hydrostatic pressure only. The stresses in the glass are therefore more uniform, allowing the column to be operated at higher pressures than column of "conventional" construction. The brackets 13 apply a bending moment to the column panel. Owing to the fact that fluid delivery is directed to the top of the resin bed 17 through the diffusing disc 16, sealing is effected as close to the delivery zone as is possible.

The invention does not preclude the use of a thin stainless steel tube as the tube 1 for containing the resin bed 17, which will work as well mechanically in the end fittings illustrated as glass in the drawing. Glass, however, has the advantage in operation that the use of glass exposes no metal to the resin and eluting media. Since the column tube itself is a straight length of tubing which may be cut off to a length to match the desired column length, the use of glass presents no problem. Matching the lengths of inner and outer tubing, that is the tube 1 and hollow jacket 2, is in no way critical, as a tolerance of at least ±¼ inch between the appropriate lengths of inner and outer tubing may exist. Glass also has the advantage of transparency to aid the operator in packing of the column with resin slurry.

It will be observed that the O-ring seal 5 rests in a groove in the inner surface of the bore of the fitting 3 and that the fitting 3 has a downwardly projecting neck 27 extending into the hollow cylinder or jacket 2 and having an outer surface with a peripheral groove receiving the O-ring 4. In this manner both the tube 1 and the hollow cylinder 2 are free to float longitudinally and do not transmit longitudinal stress to each other or to the fitting 3, they are free to expand and contract independently of each other, and are not required to be composed of material having the same temperature coefficient of expansion. Although the fitting 3 has been shown as having a tubular extension or neck 27 surrounded by the hollow cylinder 2, it will be understood that the invention is not limited thereto and does not exclude a construction in which the hollow cylinder 2 would be received in a collar extending from the fitting 3 and having an inner surface containing a groove with an O-ring sealing to the outer surface of the hollow cylinder 2.

While a particular form of the invention has been fully illustrated and described, it will be obvious to those skilled in the art that various modifications and alterations may be made therein and it is intended to cover all such modifications and alterations as may fall within the spirit and scope of the invention.

What is claimed is:

1. A mounting for a water-jacketed liquid chromatograph column comprising a pressurized tube containing component-separating resin, having an outside surface, and having first and second ends with inlet and outlet connections for eluent, and a hollow cylinder surrounding the tube and having lateral inlet and outlet connections to form a water jacket and having cylindrical surfaces with first and second ends, wherein the improvement comprises:

a first end fitting surrounding the tube and receiving the first end of the tube,
   a second end fitting surrounding the tube and receiving the second end of the tube,
   sealing means between the fittings and the outside surface of the tube,
   sealing means between the fittings and a cylindrical surface of the hollow cylinder,
   a column support member capable of withstanding force,
   a first connector engaging said support member and said first fitting, and
   a second connector engaging said support member and said second fitting, whereby the tube and the hollow cylinder are free to elongate and contract, and internal pressure in the tube and in the cylinder acting longitudinally acts against the fittings to be taken up by the column support member without subjecting the tube or the cylinder to longitudinal force or tensile strain.

2. The improvement defined in claim 1 wherein the force withstanding member constitutes a support, the first connector comprises a first bracket secured to the support and engaging the first fitting, and the second connector comprises a second bracket secured to the support and engaging the second fitting.

3. The improvement defined in claim 2 wherein the support comprises a panel with means for adjustably positioning the brackets thereon.

4. The improvement defined in claim 3 wherein the water-jacketed cylinder has an inner surface and each fitting has a tubular extension with a surface surrounded by the inner surface at one end of the water jacket hollow cylinder and one of the adjacent surfaces has an annular groove wherein the sealing means for such adjacent surfaces is contained.

5. The improvement defined in claim wherein each end fitting comprises a restrained part and a part removably secured to the support member, the bracket and the restrained part of the end fitting having surfaces abutting each other whereby the restrained part is held against longitudinal movement, and the removably secured parts are positioned longitudinally inward of the restrained parts and endwise movement thereof is also limited by the restrained parts.

6. The improvement defined in claim 3 wherein the first fitting is an upper fitting and the second fitting is a lower fitting and the tube and hollow cylinder are mounted with a vertical axis.

7. The improvement defined in claim 6 wherein the hollow cylinder water jacket has a fluid inlet at its lower end and a fluid outlet at its upper end.

8. The improvement defined in claim 5 wherein the removably secured parts of the end fittings carry the sealing means and are adapted to abut the bracket to limit longitudinal movement of the removably secured parts under force from pressure within the water jacket cylinder.

9. In a liquid chromatograph column:
   a tubular column,
   a component separating resin supported within said column,
   an eluent-supplying tube of smaller diameter than the bore of the tubular column, said eluent tube having an integral flange at the end thereof fitting in the bore of the tubular column, said flange positioned to substantially abut against said resin,
   a sealing member surrounding the eluent tube adjacent said flange and sealing the space between the outer surface of said eluent tube and the inner surface of said column,
   a substantially rigid clampable tube surrounding the eluent tube within the bore of the tubular column, said clampable tube having an end adapted to abut against said sealing member and forcing said sealing member against said flange whereby the seal and the clampable tube relieve the tubular column of axial force created by hydrostatic pressure within said column and, as the pressure increases, the seal provided by the sealing member is tightened.

10. The combination defined in claim 9 including a bushing surrounding the eluent tube, fitting in the bore of the tubular column, between the sealing member and the end of the clampable tube to transmit axial force acting on the sealing member to the end of the clampable tube and provide a seal therebetween.

11. The combination defined in claim 10 including a porous disc of polymeric material interposed between the resin and the flange.

12. The combination defined in claim 11 for the lower end of a column, including a resin support screen interposed between the porous disc and the resin.

13. The combination defined in claim 9 in which said eluent tube is a flexible member.

* * * * *

UNITED STATES PATENT OFFICE
CERTIFICATE OF CORRECTION

Patent No. 3,878,099      Dated April 15, 1975

Inventor(s) David G. Ogle

It is certified that error appears in the above-identified patent and that said Letters Patent are hereby corrected as shown below:

Column 6, line 2     after "claim" insert --1--

Signed and sealed this 15th day of July 1975.

(SEAL)
Attest:

RUTH C. MASON
Attesting Officer

C. MARSHALL DANN
Commissioner of Patents
and Trademarks